United States Patent

Schneider et al.

Patent Number: 5,819,822
Date of Patent: Oct. 13, 1998

[54] FLUID FILLER TOOL FOR A SPIN-ON FLUID FILTER

[75] Inventors: Marvin P. Schneider, East Peoria; Roger J. Rohlfing, Dunlap, both of Ill.

[73] Assignee: Caterpillar Inc., Peoria, Ill.

[21] Appl. No.: 624,239

[22] Filed: Mar. 29, 1996

[51] Int. Cl.$^6$ .................................................. B65B 3/00
[52] U.S. Cl. ........................ 141/285; 141/98; 141/333; 141/297; 141/364; 141/384
[58] Field of Search ............... 141/98, 285, 297, 141/310, 7, 59, 331, 333, 339–342, 364, 375, 383, 384, 386

[56] References Cited

U.S. PATENT DOCUMENTS

| | | | |
|---|---|---|---|
| 530,228 | 12/1894 | Keiner | 141/297 X |
| 1,810,822 | 6/1931 | Erickson | 141/297 X |
| 2,517,759 | 8/1950 | Bentzen | 141/383 X |
| 3,973,602 | 8/1976 | Kruse | 141/297 X |
| 4,608,161 | 8/1986 | Niemeier | 210/149 |
| 4,618,417 | 10/1986 | Yamanouchi et al. | 210/149 |
| 4,683,055 | 7/1987 | Bosen et al. | 210/120 |
| 4,732,671 | 3/1988 | Thornton et al. | 210/86 |
| 4,733,449 | 3/1988 | Spearman | 141/340 X |
| 4,865,731 | 9/1989 | Setzer, Sr. | 210/232 |
| 5,249,608 | 10/1993 | Hua | 141/98 X |
| 5,259,953 | 11/1993 | Baracchi et al. | 210/232 |
| 5,322,624 | 6/1994 | Rogers et al. | 210/232 |
| 5,336,406 | 8/1994 | Stanford et al. | 210/235 |
| 5,546,999 | 8/1996 | Parker | 141/98 |

Primary Examiner—J. Casimer Jacyna
Attorney, Agent, or Firm—Pankaj M. Khosla

[57] ABSTRACT

A fluid filler tool for a spin-on fluid filter comprises a tubular housing having an annular peripheral wall, an open end and a closed end. The closed end has one or more openings to allow fluid to flow therethrough and into fluid inlet ports of the fluid filter. The closed end has centrally located venting means for allowing air inside the filter to escape therefrom when the fluid filler tool is positioned on the filter and when the filter is being filled with fluid. The closed end has centrally located tool positioning means for allowing the filler tool to sealingly and removably fit into a centrally located fluid exit port of the spin-on filter. The fluid filler tool allows the filter assembly to be pre-filled with a fluid only through the fluid inlet ports and prevents any fluid from entering the fluid exit port of the filter assembly.

15 Claims, 5 Drawing Sheets

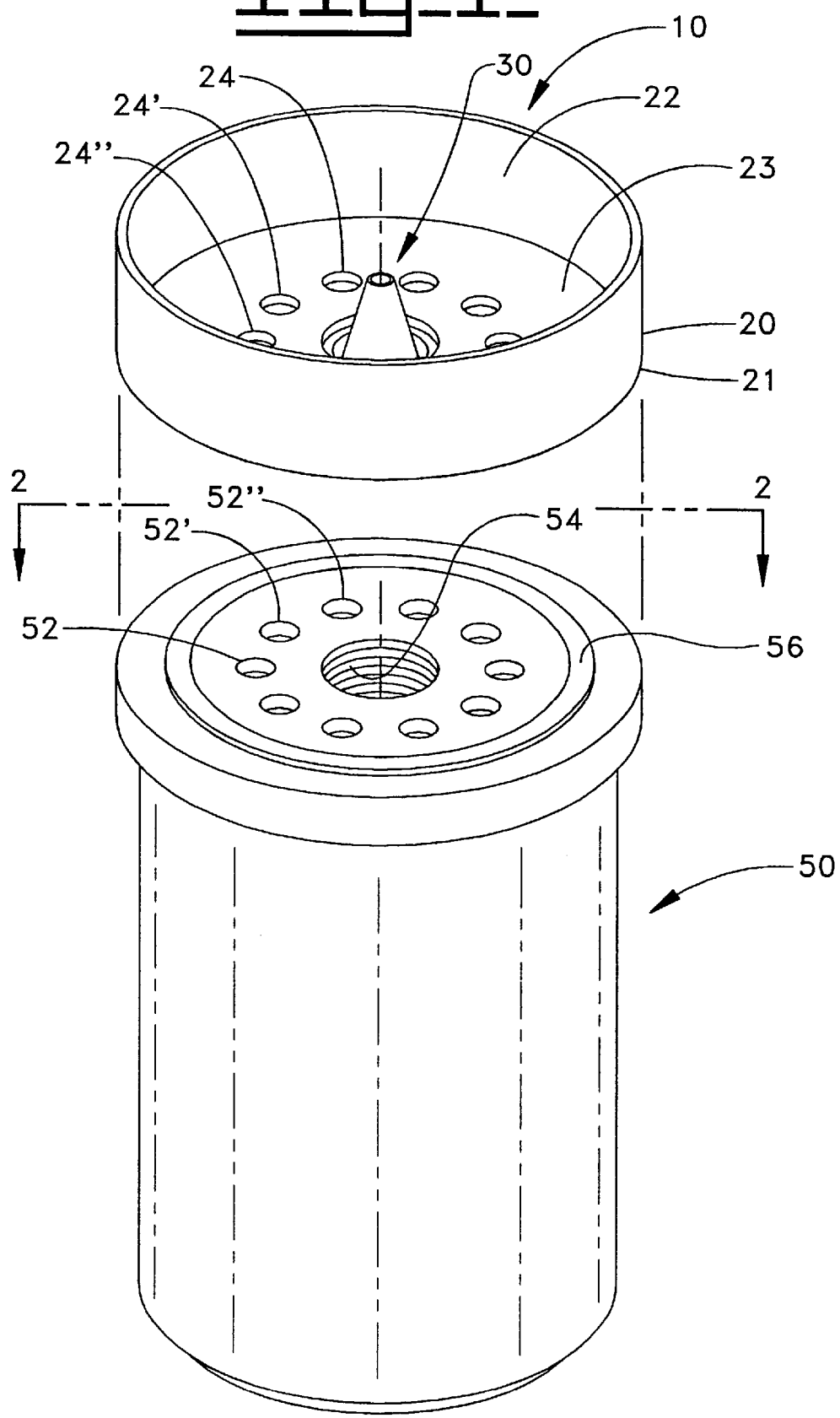

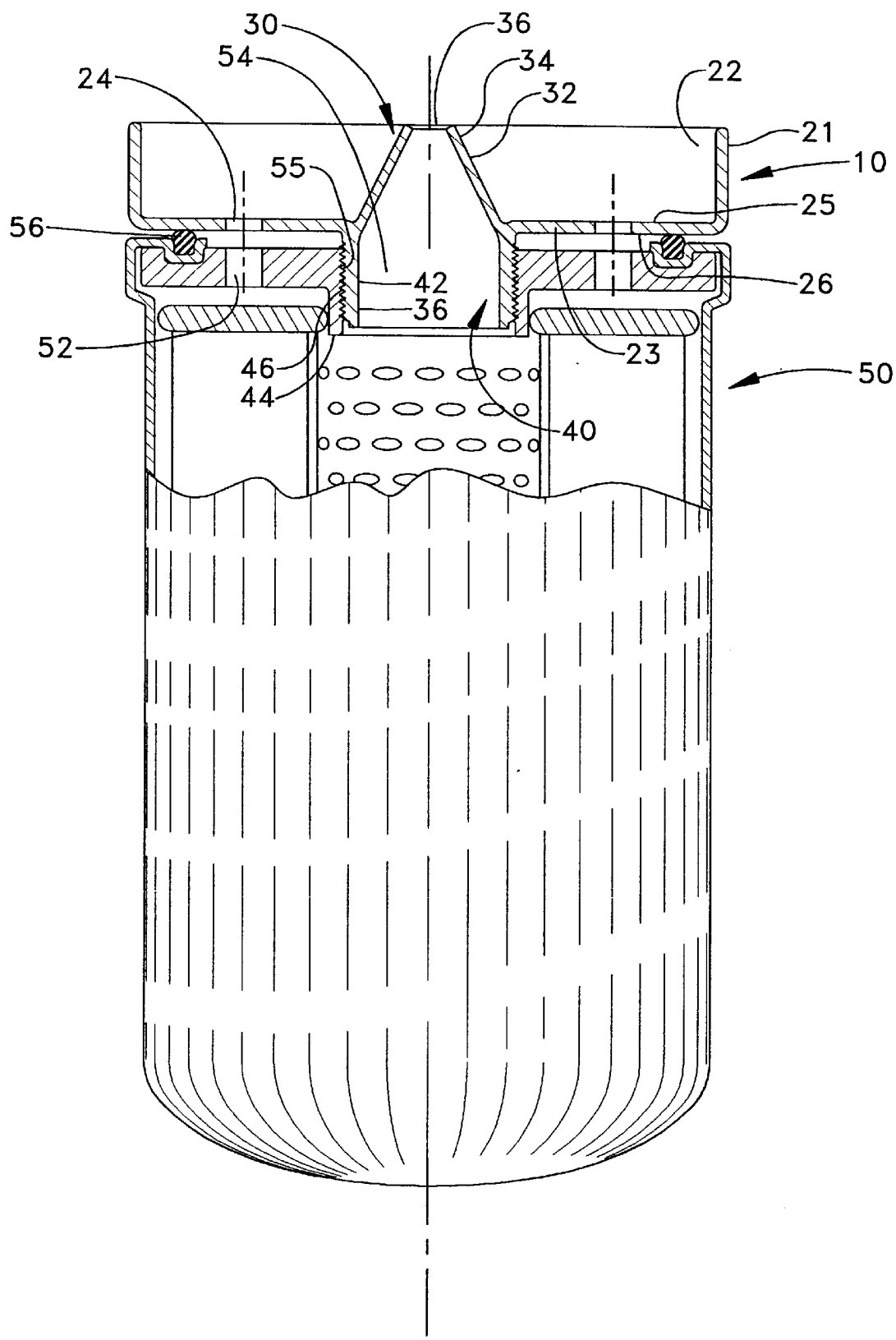

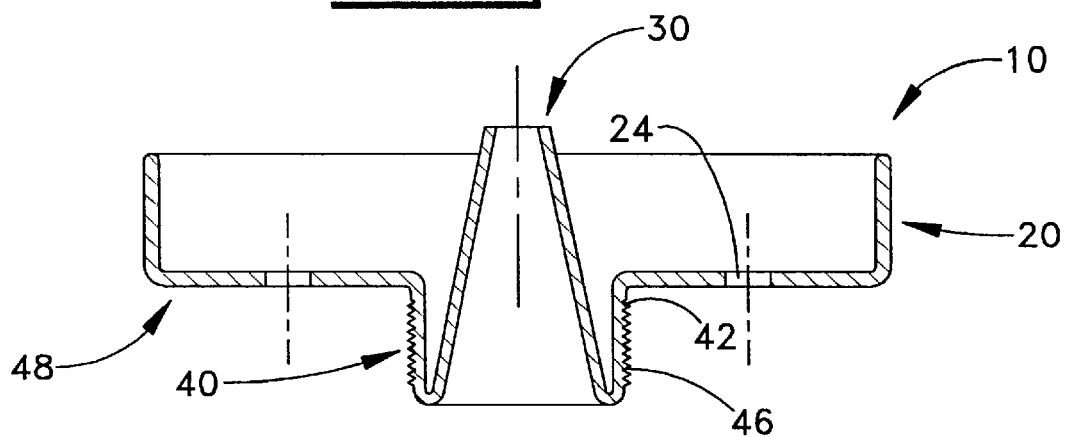
Fig_3_
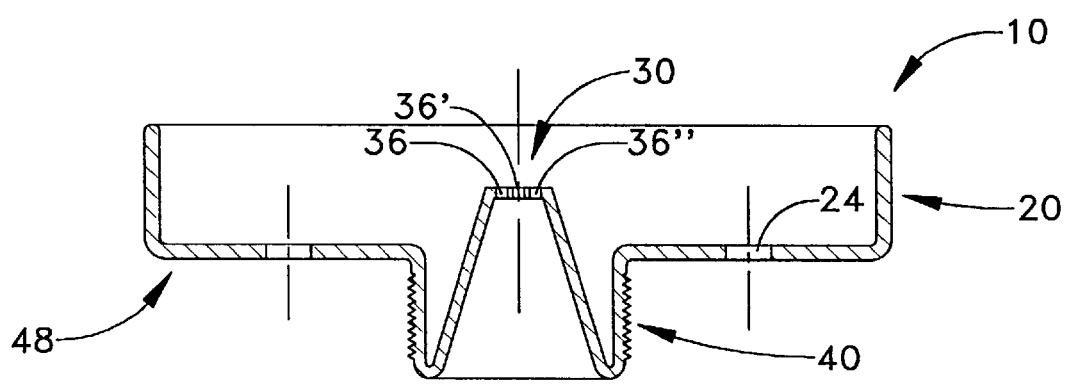
Fig_4_
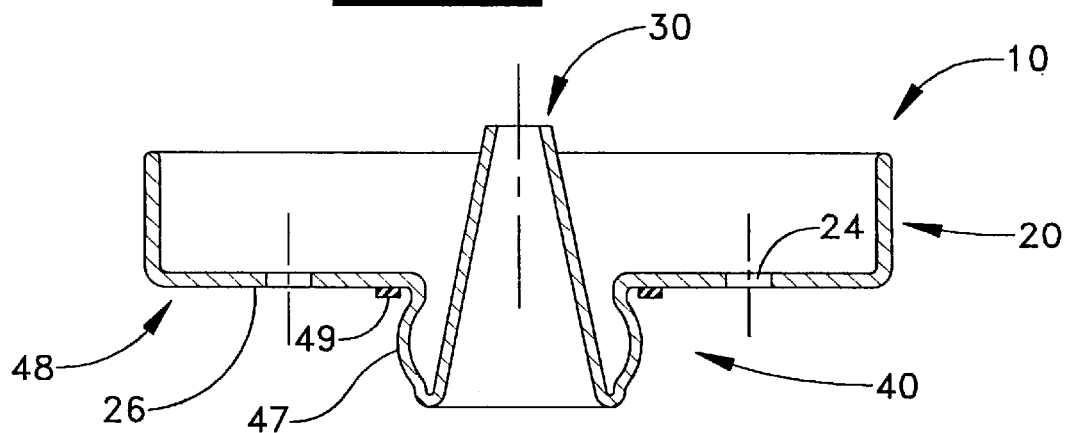
Fig_5_

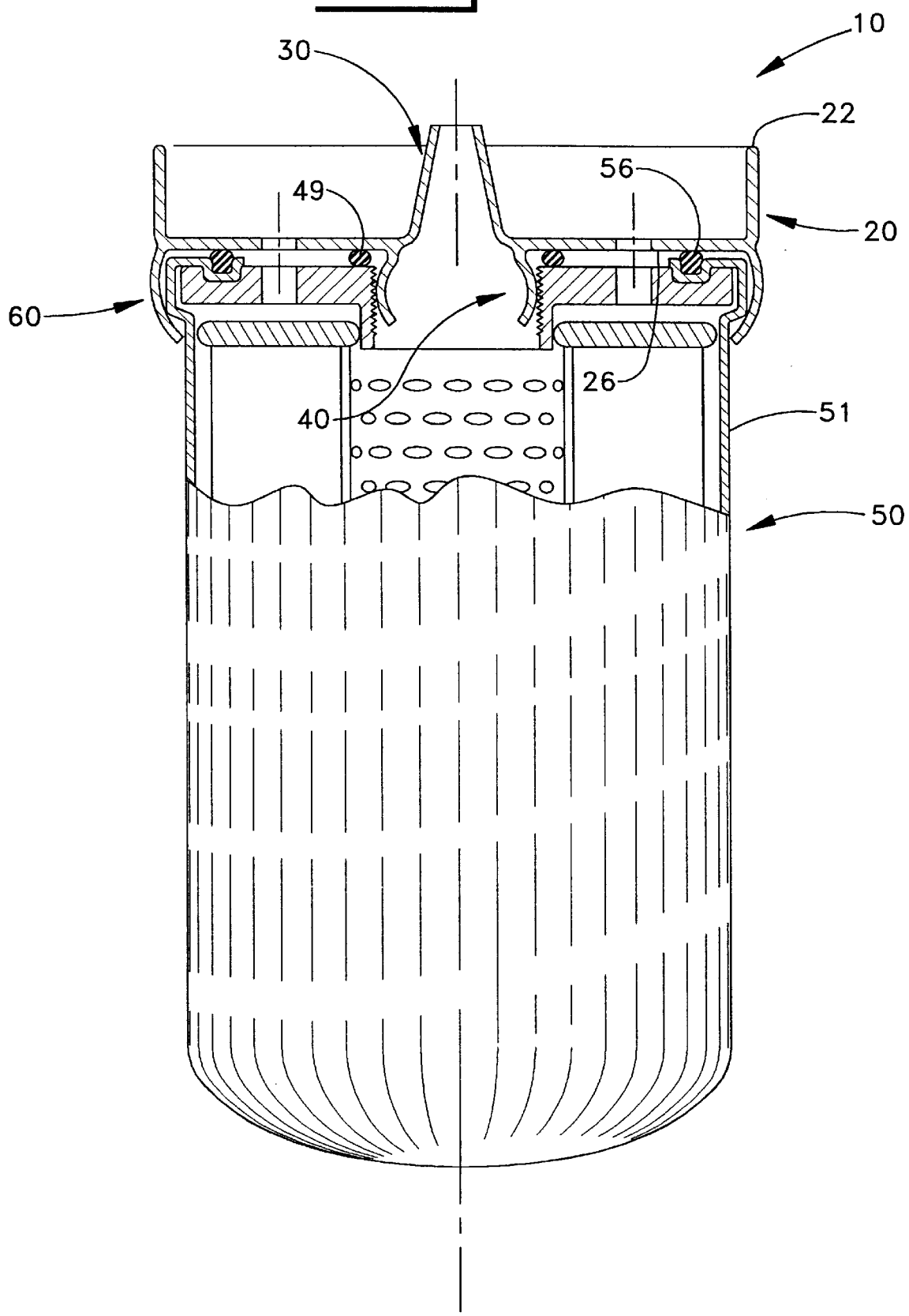

FLUID FILLER TOOL FOR A SPIN-ON FLUID FILTER

TECHNICAL FIELD

The present invention relates generally to fluid filters, and more particularly to a fluid filler tool for a spin-on type fluid filter.

BACKGROUND ART

Filter assemblies for filtering liquids such as engine oil, fuel and hydraulic oil are well known in the art. An oil filter assembly is typically installed in the oil lines of an internal combustion engines to remove grit and other contaminants from the engine lubricating oil to provide a longer engine life and improved engine performance. Similarly, a fuel filter assembly is installed in the engine fuel lines to remove grit and other contaminants from the fuel before it enters a fuel injection system of an engine to increase the service life of the fuel injection components.

A typical fluid filter assembly has a filter housing which contains a filter element used for filtering the fluid as it circulates through the housing. The filter housing ordinarily has a first end adapted for coupling the filter assembly to the fluid circulation or fluid supply system via an internally threaded fluid exit port that threads onto a corresponding externally threaded configuration on the fluid system. The filter housing also has a second end which is ordinarily closed. The fluid exit port is ordinarily centrally located in a housing cover which is peripherally attached to the first end of the housing. Contaminated fluid flows into the filter housing through fluid inlet holes located in the cover and surrounding the fluid exit port, and clean, filtered fluid flows out of the filter housing through the fluid exit port. An elastomeric gasket which surrounds the inlet holes and the exit port of a filter assembly is used to provide a leak-free seal when the filter is installed. Fluid filters with such an attachment configuration are generally referred to in the art as "spin-on" type filters.

Spin-on filters of the type described above are commonly used to filter the fuel used in diesel engine fuel systems. Generally, fuel filters are replaced with new ones at periodic intervals. When a new fuel filter has been installed, it is necessary to either stroke priming pump by hand or to crank the engine in order to pre-fill fuel into the filter and to purge the air out of the new filter. On some engines, and especially engines used in some large earthworking machines, the priming pump is difficult to operate by hand and results in operator fatigue. On the other hand, pre-filling the fuel filter by cranking the engine takes an excessive amount of time.

In order avoid hand pumping or engine cranking and to save time and labor, operators and service technicians pour fuel directly into the fuel filter prior to installation of the filter on the filter base on the engine. Unfortunately, one major problem with this approach is that because the exit port of a spin-on type fuel filter is the largest port on the filter, in most instances the operators inadvertently pour the unfiltered or "dirty" fuel into the exit port or the "clean" side of the filter. When the engine is first started, this unfiltered fuel immediately enters the fuel injection system of the engine. This "dirty" fuel having fine debris or contaminants can seriously damage the fuel injection components and reduce the life of the fuel injection system.

It is desirable to have a tool that allows the filter assembly to be pre-filled with a fluid only through the fluid inlet ports, or the "dirty" side of the filter. It is further desirable that the tool prevent any fluid from entering the fluid exit port of the filter and thus protect the "clean" side of the filter. It is still further desirable the above tool be user friendly and have a design that facilitates quick installation on and off the filter.

The present invention is directed to overcome one or more problems as set forth above.

DISCLOSURE OF THE INVENTION

In one aspect of the present invention, a fluid filler tool for a spin-on fluid filter is disclosed. The filler tool comprises a tubular housing having an annular peripheral wall, an open end and a closed end. The closed end has one or more openings to allow fluid to flow therethrough and into fluid inlet ports of the fluid filter. The closed end has a top side and a bottom side. The closed end has centrally located venting means for allowing air inside the filter to escape therefrom when the fluid filler tool is positioned on the filter and when the filter is being filled with fluid. The closed end has centrally located tool positioning means for allowing the filler tool to sealingly and removably fit into a centrally located fluid exit port of the spin-on filter.

In another aspect of the present invention, a fluid filler tool for a spin-on fluid filter comprises a tubular housing having an annular peripheral wall, an open end and a closed end. The closed end has one or more openings to allow fluid to flow therethrough and into fluid inlet ports of the fluid filter. The closed end has a top side and a bottom side. The closed end has centrally located venting means for allowing air inside the filter to escape therefrom when the fluid filler tool is positioned on the filter and when the filter is being filled with fluid. The closed end has peripherally located tool positioning means for allowing the filler tool to sealingly and removably fit onto the spin-on filter housing.

BRIEF DESCRIPTION OF THE DRAWINGS

FIG. 1 is an exploded perspective view of a filler tool used for pre-filling fluid into a filter assembly, according to one embodiment of the present invention;

FIG. 2 is a diagrammatic side view of the filler tool and filter assembly shown in FIG. 1 when assembled, a portion thereof being shown in section;

FIG. 3 is a diagrammatic sectional side view of another embodiment of the filler tool shown in FIG. 1, with venting means having a single vent opening;

FIG. 4 is a diagrammatic sectional side view of yet another embodiment of the filler tool shown in FIG. 1, with venting means having a plurality of vent openings;

FIG. 5 is a diagrammatic sectional side view of still another embodiment of the filler tool shown in FIG. 1, with positioning means having a convex wall;

FIG. 6 is a diagrammatic side view of the filler tool and filter assembly when assembled, a portion thereof being shown in section, according to another embodiment of the present invention;

BEST MODE FOR CARRYING OUT THE INVENTION

Figure 7:
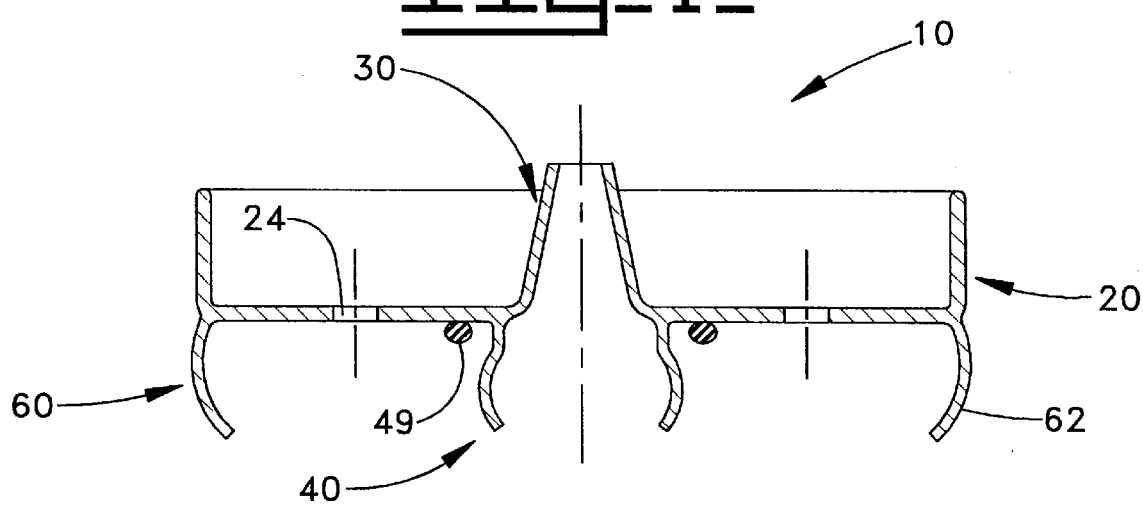
FIG. 7 is a diagrammatic sectional side view of the filler tool shown in FIG. 6.

Referring to FIG. 1, a fluid filler tool 10 for a spin-on fluid filter 50 is disclosed. The filler tool 10 comprises a tubular housing 20 having an annular peripheral wall 21, an open end 22 and a closed end 23. The closed end 23 has one or more openings 24,24'24" (hereinafter referred to by a single number 24) to allow fluid to flow therethrough and into fluid inlet ports 52,52'52" (hereinafter referred to by a single number 52) of the fluid filter 50. The closed end has a top side 25 and a bottom side 26 (shown in FIG. 2). The closed end has centrally located venting means 30 for allowing air inside filter 50 to escape therefrom when fluid filler tool 10 is positioned on filter 50 and when the filter is being filled with fluid. The closed end 23 has centrally located tool positioning means 40 (shown in FIG. 2) for allowing the filler tool 10 to sealingly and removably fit into a centrally located fluid exit port 54 of the spin-on filter 50.

In the preferred embodiment, the annular peripheral wall 21 of housing 20 extends desirably for an axial length in the range of about 25 mm to about 150 mm, and preferably in the range of about 25 mm to about 100 mm. It is anticipated that for most filters, a wall length in the above desired range will sufficient of contain the fluid being filled into the filter without causing spills.

Referring to FIG. 2, in the preferred embodiment of the present invention, the venting means 30 include a tubular portion 32 and a venting end 34. The tubular portion 32 extends axially from the top side 25 of the closed end 23 in a direction towards the open end 22. Desirably, the venting end 34 includes one or more vent openings 36,36'36" (referred hereinafter by the single number 36). Preferably, the tubular portion 32 has an axial length in the range of about 66% to about 133% of the axial length of the annular peripheral wall 21. In one preferred embodiment, as shown in FIG. 3 and FIG. 5, the tubular portion 32 has a single vent opening 36 and a length of about 120% of the length of wall 21. In an alternatively preferred embodiment, as shown in FIG. 4, the tubular portion 32 has a plurality of vent openings 36 and a length of about 75% of the length of wall 21.

Referring again to FIG. 2, in the preferred embodiment, the tool positioning means 40 include a tubular portion 42 and an open end 44. The tubular portion 42 extends axially from the bottom side 26 of the closed end 23 in a direction away from the open end 22. Preferably, the open end 44 of positioning means 40 is in fluid communication with (1) the venting end 34 of venting means 30 and (2) the fluid exit port 54 of filter 50. During the filling of the filter with fluid, the open end 44 allows the air inside the filter to enter and pass therethrough to the venting end and escape therefrom.

Referring to FIG. 3 and FIG. 4, in the preferred embodiment, the tubular portion 42 includes external threads 46 for mating with corresponding internal threads 55 on fluid exit port 54 of filter 50. Preferably, the bottom side 26 has a circumferential sealing surface 48 for mating with a corresponding sealing ring 56 on the filter 50. This sealing surface ensures that the fluid being poured into the tool does not spill over the side of the filter assembly.

Referring to FIG. 5, in an alternate embodiment, the tubular portion 42 has a convex shaped external wall 47 for allowing the tubular portion to press-fit into the fluid exit port of the filter. Preferably, a sealing gasket 49 is disposed around the tubular portion 42 for providing positive sealing when tool 10 is positioned into fluid exit port 54 of filter 50. This sealing gasket 49 is provided to ensure that no fluid enter the fluid exit port of the filter during filling. Preferably, sealing gasket 49 has a rectangular cross section and is made from an injection molded elastomeric material, desirably a filled nitrile rubber. The sealing ring may have other cross section geometries, such as circular for example, and may be made from a variety of different elastomers, such as hydrogenated nitrile rubber, for example, depending on the desired elastomer properties such as fuel or oil resistance. It should also be understood that various other shapes of the positioning means 40, such as a generally corrugated tubular portion of the positioning means are envisioned and are within the bounds of this invention.

Figure 8:
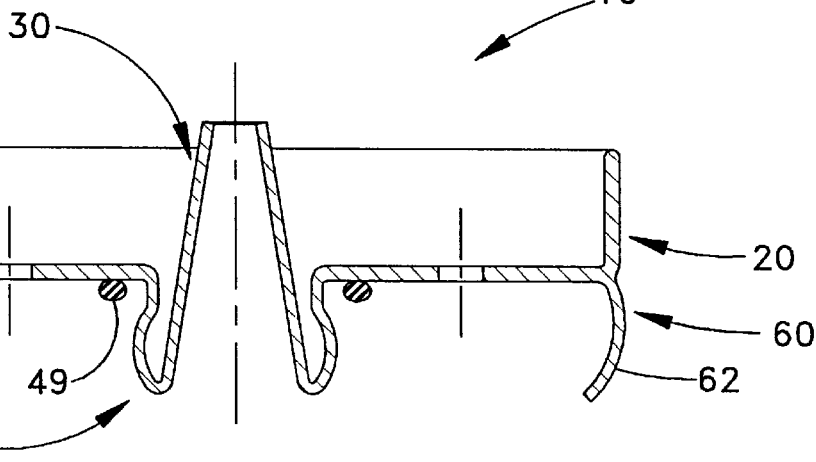
FIG. 8 is a diagrammatic sectional side view of another embodiment of the filler tool shown in FIG. 6, having a single vent opening.
Figure 9:
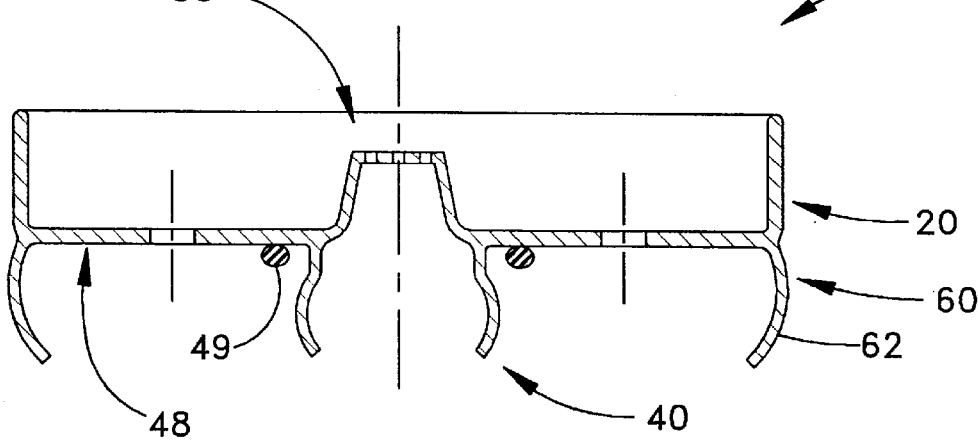
FIG. 9 is a diagrammatic sectional side view of yet another embodiment of the filler tool shown in FIG. 6, having a plurality of vent openings.

Referring to FIG. 6, in another embodiment of the present invention, tool 10 has a centrally located tool positioning means 40 and a peripherally located tool positioning means 60 for allowing tool 10 to sealingly and removably fit onto a housing 51 of the spin-on filter 50. Preferably, means 60 include a peripheral wall 62 extending axially from the bottom side 26 and in a direction away from the open end 22. The peripheral wall has a slightly curved shaped to allow the tool to snap-fit onto the housing 51. A sealing gasket 49 is disposed about means 40 to prevent fluid from leaking into the fluid exit port of the filter. Alternate embodiments of tool 10 having means 60 are shown in FIGS. 7, 8 and 9.

In the preferred embodiment, tool 10 may be constructed from a variety of materials, such as from die stamped mild steel and having a general configuration as shown in FIGS. 3, 4, 5 and 8. Alternatively, tool 10 may be machined from aluminum or other suitable metals. Preferably, a disposable and economically manufacturable tool may be constructed by injection molding from a variety of plastic materials, such as high density polyethylene (HDPE), polypropylene, polystyrene or nylon.

It should be understood that the present invention is not limited to the preferred embodiment. One skilled in the art may make changes to the size, shape and material of construction of the components within the principles of this invention and to the extent provided by the broad meaning of the appended claims.

INDUSTRIAL APPLICABILITY

The fluid filler tool 10 is used in the following manner. Tool 10 is first press-fitted or threaded into the fluid exit port 54 of filter 50. Alternatively, tool 10 is snap-fitted onto the filter housing 51. Then the fluid is poured into the tool housing 20. The air in the filter is displaced by the fluid, and the air escapes out of the vent opening 36 of the tool. The fluid is allowed only to enter the fluid inlet side, or the "dirty" side of the filter.

This tool enables an operator or service person to pre-fill the filter with fluid prior to installation of the filter without the risk of pouring unfiltered fluid into the fluid inlet, or the "clean" side of the filter.

The filler tool of the present invention is particularly useful for pre-filling fuel, engine oil and hydraulic oil in fuel, engine oil and hydraulic oil filters respectively. Engine oil and fuel filters are used in internal combustion engines for off-highway trucks, earthworking, construction and mining equipment, marine applications, power generation equipment, buses, general freight trucks, recreational vehicles and automotive applications. The hydraulic filters are used in the hydraulic systems of those off-highway trucks, earthworking, construction and mining equipment.

Other aspects, objects and advantages of this invention can be obtained from a study of the drawings, the disclosure and the appended claims.

We claim:

1. A fluid filler tool for a spin-on fluid filter, comprising:
   a tubular housing having an annular peripheral wall, an open end and a closed end;

said closed end having at least one opening to allow fluid to flow therethrough and into fluid inlet ports of said fluid filter, said closed end having a top side and a bottom side;

said closed end having centrally located venting means for allowing air inside said filter to escape therefrom when said fluid filler tool is positioned on said filter and when said filter is being filled with fluid;

said closed end having centrally located tool positioning means for allowing said filler tool to sealingly and removably fit into a centrally located fluid exit port of said spin-on filter;

said venting means including a tubular portion, a first end and a venting end, said tubular portion extending axially from said top side of said closed end in a direction towards said open end, said first end of said tubular portion being attached to the top side of the closed end of said tubular housing, and said venting end being disposed in a direction towards the open end of said tubular housing;

said tool positioning means including a tubular portion extending axially from said bottom side of said closed end in a direction away from said open end of said housing, said filter being in sealing engagement with the bottom side of the closed end of said housing when said tool positioning means fit into the centrally located fluid exit port of said spin-on filter, wherein said tool positioning means include an open end oriented in a direction away from said closed end of said housing, and wherein the open end of said positioning means is in fluid communication with the venting end of said venting means and the fluid exit port of said filter.

2. A fluid filler tool, as set forth in claim 1, wherein said venting means include a tubular portion having a conical shape.

3. A fluid filler tool, as set forth in claim 1, wherein said venting end includes having at least one vent opening.

4. A fluid filler tool, as set forth in claim 1, wherein the open end of said positioning means allows said air inside said filter to enter and pass therethrough to said venting end and escape therefrom when the filter is being filled with said fluid.

5. A fluid filler tool, as set forth in claim 1, wherein said tubular portion includes external threads for mating with corresponding internal threads on said fluid exit port of said filter.

6. A fluid filler tool, as set forth in claim 1, wherein said tubular portion has a convex shaped external wall for allowing said tubular portion to press-fit into said fluid exit port of said filter.

7. A fluid filler tool, as set forth in claim 6, wherein a seal is disposed around said tubular portion of said positioning means for providing positive sealing when said filler tool is positioned into said fluid exit port of said filter.

8. A fluid filler tool, as set forth in claim 1, wherein said bottom side has a circumferential sealing surface for mating with a corresponding sealing ring on said filter.

9. A fluid filler tool, as set forth in claim 1, wherein said tubular portion has a length in the range of about 66% to about 133% of the length of said annular peripheral wall.

10. A fluid filler tool, as set forth in claim 1, wherein said annular peripheral wall of said tubular housing extends for an axial length in the range of about 25 mm to about 100 mm.

11. A fluid filler tool, as set forth in claim 1, wherein said filler tool is formed from HDPE.

12. A fluid filler tool for a spin-on fluid filter, comprising:

a tubular housing having an annular peripheral wall, an open end and a closed end;

said closed end having at least one opening to allow fluid to flow therethrough and into fluid inlet ports of said fluid filter, said closed end having a top side and a bottom side, said bottom side having a circumferential sealing surface for mating with a corresponding sealing ring on said filter;

said closed end having centrally located venting means for allowing air inside said filter to escape therefrom when said fluid filler tool is positioned on said filter and when said filter is being filled with fluid;

said closed end having peripherally located tool positioning means for allowing said filler tool to sealingly and removably fit onto said spin-on filter housing;

said venting means including a tubular portion, a first end and a venting end, said tubular portion extending axially from said top side of said closed end in a direction towards said open end, said first end of said tubular portion being attached to the top side of the closed end of said tubular housing, and said venting end being disposed in a direction towards the open end of said tubular housing.

13. A fluid filler tool, as set forth in claim 12, wherein said venting means are in seal-tight fluid communication with fluid exit port of said filter when said fluid filler tool is positioned on said filter.

14. A fluid filler tool, as set forth in claim 13, wherein said venting end includes one or more vent openings.

15. A fluid filler tool, as set forth in claim 12, wherein said tool positioning means include a peripheral wall extending axially from said bottom side and in a direction away from said open end, said peripheral wall being adapted to snap-fit onto said housing of said filter.

* * * * *